US012120787B2

(12) United States Patent
Chen et al.

(10) Patent No.: US 12,120,787 B2
(45) Date of Patent: Oct. 15, 2024

(54) CONTROL CIRCUIT FOR A LIGHT ADJUSTMENT AND A TONE ADJUSTMENT AND AN IMPLEMENTATION METHOD THEREOF

(71) Applicant: Hengdian Group Tospo Lighting Co., Ltd., Zhejiang (CN)

(72) Inventors: Liang Chen, Zhejiang (CN); Jianjun Xiao, Zhejiang (CN); Ming Jiang, Zhejiang (CN); Fang Wang, Zhejiang (CN)

(73) Assignee: HENGDIAN GROUP TOSPO LIGHTING CO., LTD., Dongyang (CN)

( * ) Notice: Subject to any disclaimer, the term of this patent is extended or adjusted under 35 U.S.C. 154(b) by 5 days.

(21) Appl. No.: 17/980,006

(22) Filed: Nov. 3, 2022

(65) Prior Publication Data

US 2023/0209672 A1 Jun. 29, 2023

(30) Foreign Application Priority Data

Dec. 24, 2021 (CN) .......................... 202111599113.4

(51) Int. Cl.
*H05B 45/20* (2020.01)
*H05B 45/10* (2020.01)

(52) U.S. Cl.
CPC ............. *H05B 45/20* (2020.01); *H05B 45/10* (2020.01)

(58) Field of Classification Search
CPC ................................ H05B 45/20; H05B 45/10
See application file for complete search history.

(56) References Cited

U.S. PATENT DOCUMENTS

2019/0234567 A1* 8/2019 Lee ........................ H05B 45/24
2021/0029797 A1* 1/2021 Huang ................... H05B 45/20
2021/0185780 A1* 6/2021 Lula ..................... H05B 45/325
2021/0219395 A1* 7/2021 McGrath ................ H05B 45/20

* cited by examiner

*Primary Examiner* — Minh D A
(74) *Attorney, Agent, or Firm* — MUNCY, GEISSLER, OLDS & LOWE, P.C.

(57) ABSTRACT

The invention discloses a light adjustment and tone adjustment control circuit, which comprises a power supply circuit and a light adjustment circuit connected with the power supply circuit. An output end of the power supply circuit is connected with a first LED light source and a second LED light source. The two LED light sources are connected in series, and the tube pressure and color temperature of the first LED light source and the second LED light source are different; the invention also discloses a realization method of a light adjustment and tone adjustment control circuit. In the present invention, at least two LED light sources with different tube pressures and color temperatures are connected in series to form a whole light source, and the output current of the power supply circuit can be changed by the light adjustment circuit to realize light adjustment and tone adjustment, which has the characteristics of simple circuit design and low operating cost.

6 Claims, 8 Drawing Sheets

CONTROL CIRCUIT FOR A LIGHT ADJUSTMENT AND A TONE ADJUSTMENT AND AN IMPLEMENTATION METHOD THEREOF

TECHNICAL FIELD

The invention belongs to the technical field of light adjustment and tone adjustment of LED light sources, and in particular relates to a control circuit for a light adjustment and a tone adjustment and an implementation method thereof.

TECHNICAL BACKGROUND

With the rapid development of smart lighting, more and more functions can be realized by smart lighting. For example, many existing smart lighting can realize the function of light adjustment and tone adjustment. Light adjustment refers to adjusting the brightness of the light units. Tone adjustment refers to adjusting the color temperature of the light units, which can also be understood as adjusting the color of the light units.

The existing light adjustment and tone adjustment control circuit usually includes: an AC-to-DC unit for powering a light adjustment and tone adjustment unit and a light unit; a power supply unit used to convert the voltage of an electrical signal output by the AC to DC unit and supply power to a main control unit; the light adjustment and tone adjustment unit for adjusting the brightness and/or color temperature of the light unit according to the light adjustment and tone adjustment control signal provided by the main control unit. The tone adjustment control principle of the light adjustment and tone adjustment unit is usually as follows: when the main control unit outputs a low-level tone adjustment control signal, the warm light units are controlled to light up; when the main control unit outputs a high-level tone adjustment control signal, the cold light units are controlled to light up; when the main control unit outputs a medium-level tone adjustment control signal, the light units of both color temperatures are controlled to light up.

However, the existing light adjustment and tone adjustment control circuit has the problems of complicated circuit design, high operating cost and low user selectivity.

SUMMARY OF THE INVENTION

The objective of the present invention is to provide a control circuit for a light adjustment and a tone adjustment to solve the above-mentioned problems in the technical background. The control circuit for a light adjustment and a tone adjustment provided by the invention has the characteristics of simple circuit design, low operating cost and better user experience.

Another objective of the present invention is to provide an implementation method for a control circuit for a light adjustment and a tone adjustment.

To achieve the above objectives, the present invention provides the following technical solutions: a control circuit for a light adjustment and a tone adjustment, comprising a power supply circuit and a light adjustment circuit connected to the power supply circuit, an output end of the power supply circuit is connected with a first LED light source and a second LED light source, the first LED light source is connected in series with the second LED light source, and a tube pressure and a color temperature of the first LED light source and those of the second LED light source are different.

In order to diversify the design of the light source circuit, further, the first LED light source comprises a plurality of first LED lamp beads, and the plurality of the first LED lamp beads are connected in series in sequence or connected in parallel after connections in series. The second LED light source comprises a plurality of second LED lamp beads, and the plurality of the second LED lamp beads are connected in series in sequence or connected in parallel after connections in series. The color temperature of the first LED lamp beads and that of the second LED lamp beads are different.

In order to provide users with more options, so as to make the user experience better, further, the first LED light source comprises a first switch circuit and at least two sets of third LED lamp beads connected in series in sequence, the at least two sets of third LED lamp beads connected in series in sequence are respectively connected to the first switch circuit, and a color temperature of each set of the third LED lamp beads connected in series is different from each other. The second LED light source comprises a second switch circuit and at least two sets of fourth LED lamp beads connected in series in sequence, the at least two sets of fourth LED lamp beads connected in series in sequence are respectively connected to the second switch circuit, and a color temperature of each set of the fourth LED lamp beads connected in series is different from each other. The color temperature of each set of the third LED lamp beads connected in series is also different from the color temperature of each set of the fourth LED lamp beads connected in series.

In order to be applied to different dimmers, further, the light adjustment circuit is a 0-10V light adjustment circuit or a first light adjustment circuit, and the first light adjustment circuit is a resistance light adjustment circuit or thyristor light adjustment circuit.

In order to apply to different power supply circuits, further, the power supply circuit is a switching power supply or a linear power supply.

Further in the present invention, a method for realizing the control circuit for a light adjustment and a tone adjustment comprises:

(1) connecting a first LED light source and a second LED light source with different tube pressure and color temperature in series to form an LED light source;

(2) supplying power to the LED light source by a power supply circuit;

(3) adjusting an output current of the power supply circuit by the control circuit to realize the light adjustment and the tone adjustment.

Compared with the existing technology, the beneficial effects of the present invention are:

1. According to the present invention, at least two LED light sources with different tube pressures and color temperatures are connected in series to form a light source for a light fixture, and the output current of the power supply circuit can be changed by a light adjustment circuit to realize light adjustment and tone adjustment. It has the advantages of simple circuit design and low operating cost;
2. The first LED light source and the second LED light source of the present invention respectively comprise several LED lamp beads connected in series or in parallel with each other, so that the design of the light source circuit can be diversified;

3. A switch circuit can be added to the first LED light source and/or the second LED light source of the present invention. The switch circuit controls the conduction of LED lamp beads with different color temperatures inside the corresponding LED light source, so as to realize the expansion of various color temperature combinations, provide users with more selectivity, and thus make the user experience better;
4. The light adjustment circuit of the present invention can be a 0-10V light adjustment circuit, a resistance light adjustment circuit or a thyristor light adjustment circuit, so that the light source circuit of the present invention can be applied to different light adjustment circuits;
5. The power supply circuit of the present invention can be a switching power supply or a linear power supply, and the light source circuit of the present invention can be applied to different power supply circuits.

In the Figures: 1. power supply circuit; 2. first LED light source; 21. first switch circuit; 3. second LED light source; 31. second switch circuit; 4. 0-10V light adjustment circuit; 5. first tone adjustment circuit.

DESCRIPTION

The technical solutions in the embodiments of the present invention will be clearly and completely described below with reference to the accompanying figures in the embodiments of the present invention. Obviously, the described embodiments are only a part of the embodiments of the present invention, but not all of the embodiments. Based on the embodiments of the present invention, all other embodiments obtained by those of ordinary skill in the art without inventive efforts shall fall within the protection scope of the present invention.

Embodiment 1

Figure 1:
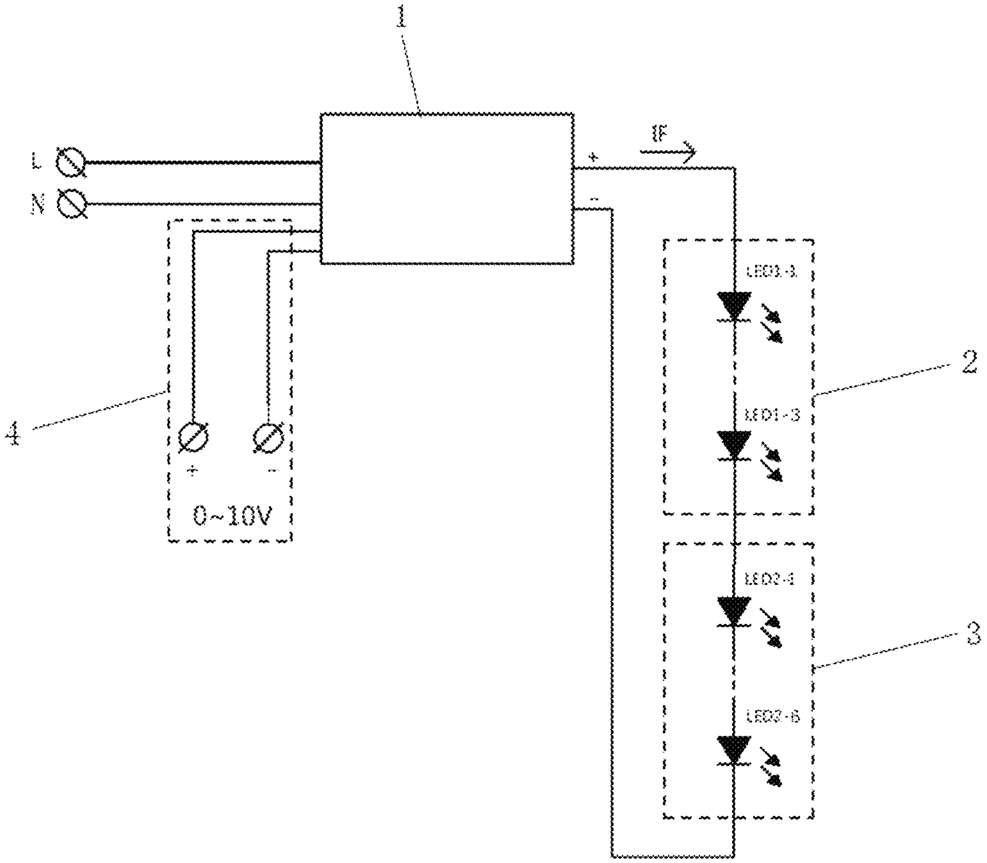
FIG. 1 is a light adjustment and tone adjustment circuit diagram of Embodiment 1 of the present invention.

Referring to FIG. 1, the present invention provides the following technical solutions: a light adjustment and tone adjustment control circuit, comprising a power supply circuit 1 and a 0-10V light adjustment circuit connected to the power supply circuit 1. The output positive terminal of the power supply circuit 1 is connected to the positive terminal of the first LED light source 2. The negative terminal of the first LED light source 2 is connected to the positive terminal of the second LED light source 3. The negative terminal of the second LED light source 3 is connected to the negative terminal of the power supply circuit 1. The power supply circuit is preferably a switching power supply.

The first LED light source 2 comprises three LED1-1 to LED1-3 connected in series in sequence, the color temperature of LED1-1 to LED1-3 is 2700K, and the rated voltage of LED1 is 3V, that is, the rated tube voltage of the first LED light source 2 is 9V.

The second LED light source 3 comprises six LED2-1 to LED2-6 connected in series in sequence, the color temperature of LED2-1 to LED2-6 is 3000K, and the rated voltage of LED2 is 6V, that is, the rated tube voltage of the second LED light source 3 is 36V.

By adopting the above technical solution, the output current of the switching power supply is adjusted by the 0-10V light adjustment circuit. When both the first LED light source 2 and the second LED light source 3 are lit, the overall light source is highlighted, and the color temperature is 2700K+3000K mixed color display. When the output current decreases, the first LED light source 2 will gradually become darker, and the color mixing will cease. As a result, the brightness of the overall light source is reduced, and the relative power of the second LED light source 3 is greater, so the main display color temperature at this time is the color temperature of the second LED light source 3, thereby realizing the function of light adjustment and tone adjustment.

Embodiment 2

Figure 2:
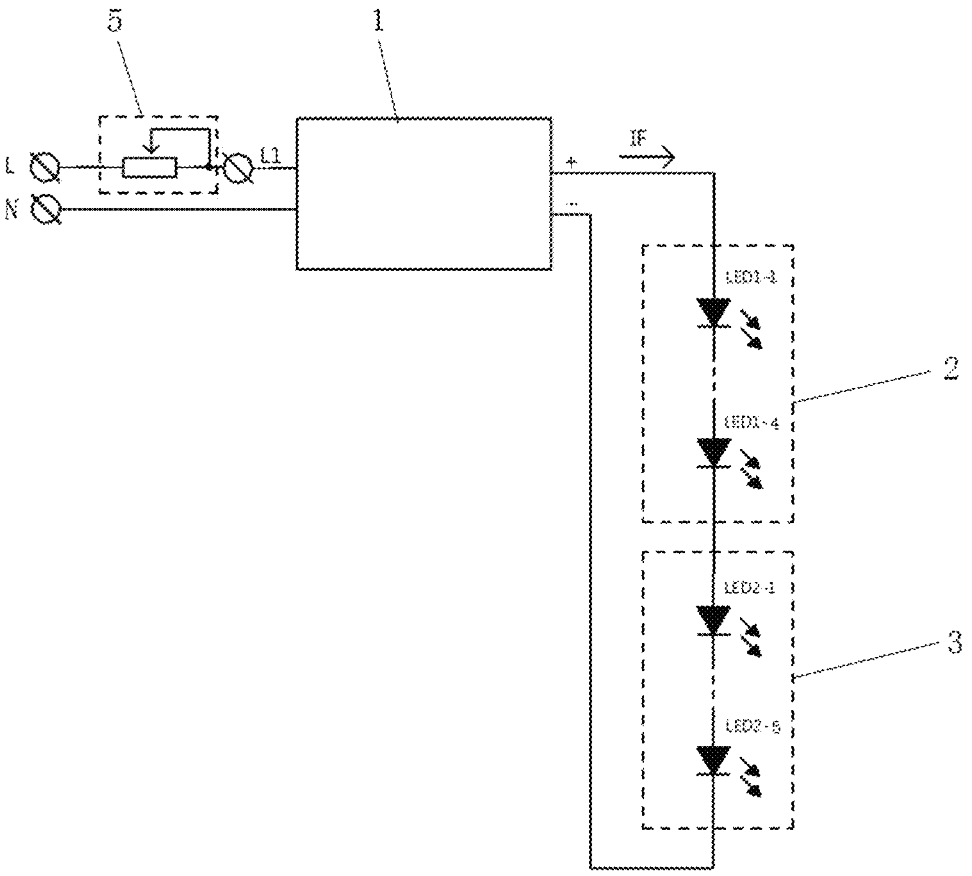
FIG. 2 is a light adjustment and tone adjustment circuit diagram of Embodiment 2 of the present invention.

Referring to FIG. 2, the difference between this Embodiment and Embodiment 1 is that the light adjustment circuit is a first light adjustment circuit 5, and the first light adjustment circuit 5 is preferably a thyristor light adjustment circuit.

The first LED light source 2 comprises four LED1-1 to LED1-4 connected in series in sequence, the color temperature of LED1-1 to LED1-4 is 3000K, and the rated voltage of LED1 is 3V, that is, the rated tube voltage of the first LED light source 2 is 12V.

The second LED light source 3 comprises five LED2-1 to LED2-5 connected in series in sequence, the color temperature of LED2-1 to LED2-5 is 4000K, and the rated voltage of LED2 is 9V, that is, the rated tube voltage of the second LED light source 3 is 45V.

By adopting the above technical scheme, the output current of the switching power supply is adjusted by the thyristor light adjustment circuit. When both the first LED light source 2 and the second LED light source 3 are lit, the overall light source is highlighted, and the color temperature is 3000K+4000K mixed color display. When the output current decreases, the first LED light source 2 will gradually become darker, and the color mixing will cease. As a result, the brightness of the overall light source is reduced, and the relative power of the second LED light source 3 is greater, so the main display color temperature at this time is the color temperature of the second LED light source 3, thereby realizing the function of light adjustment and tone adjustment.

Embodiment 3

Figure 3:
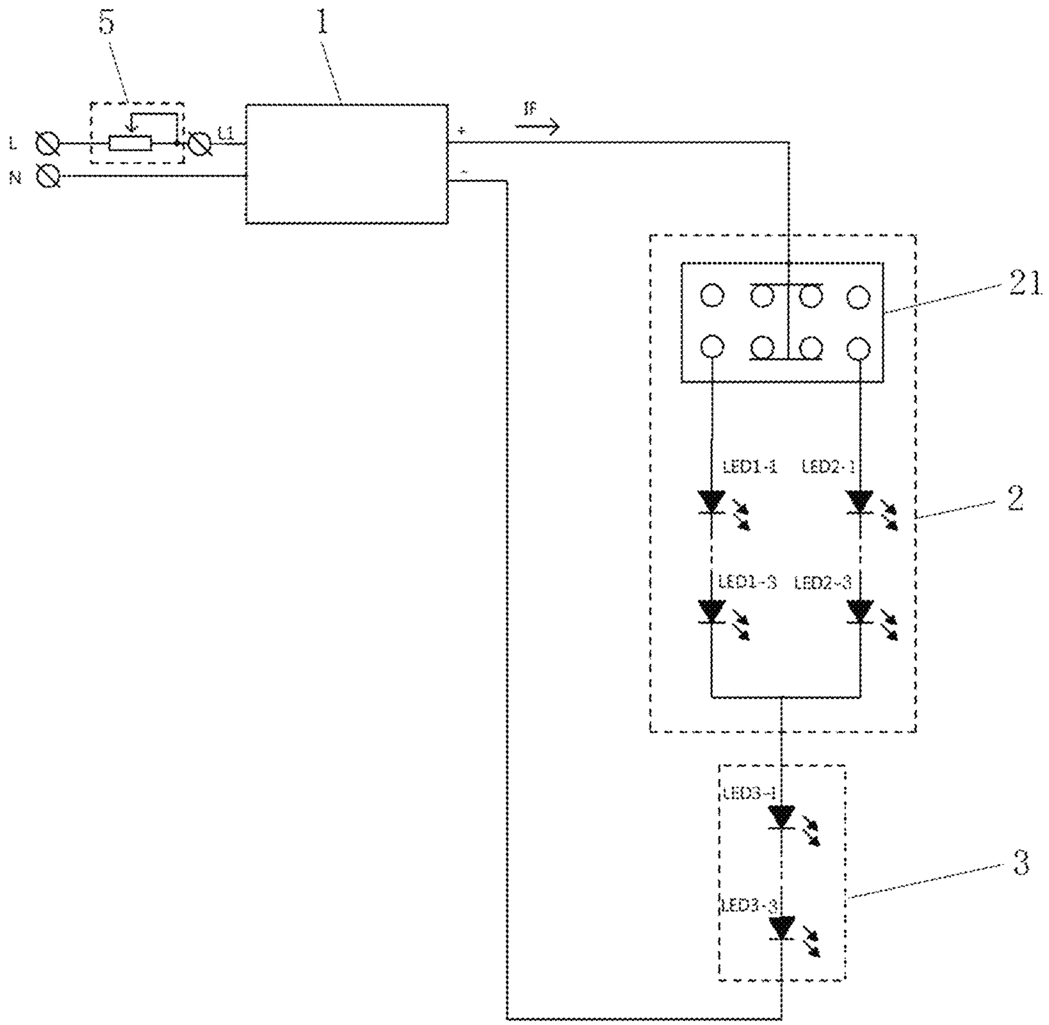
FIG. 3 is a light adjustment and tone adjustment circuit diagram of Embodiment 3 of the present invention.

Referring to FIG. 3, the difference between this Embodiment and Embodiment 2 is that the first LED light source 2 comprises a first switch circuit 21. The first switch circuit 21 is connected with three LED1-1 to LED1-3 connected in series in sequence, and three LED2-1 to LED2-3 connected in series in sequence, wherein the color temperature of LED1-1 to LED1-3 is 3000K, and the color temperature of LED2-1 to LED2-3 is 4000K.

The second LED light source 3 comprises three LED3-1 to LED3-3 connected in series in sequence, and the color temperature of LED3-1 to LED3-3 is 5000K.

By adopting the above technical solution, on the premise that both the first LED light source 2 and the second LED light source 3 are lit, when the first switching circuit 21 turns on the LED1-1 to LED1-3 alone, the LED1-1 to LED1-3 light up, and the color temperature of the whole lamp is 3000K+5000K mixed color display.

When the first switch circuit 21 turns on LED2-1 to LED2-3 alone, LED2-1 to LED2-3 light up, and the color temperature of the whole lamp is 4000K+5000K mixed color display.

When the first switch circuit 22 turns on LED1-1 to LED1-3 and LED2-1 to LED2-3 at the same time, LED1-1 to LED1-3 and LED2-1 to LED2-3 are connected in parallel and light up at the same time. At this time, the color temperature of the whole lamp is 3500K (3000K+4000K)+5000K mixed color display.

In this embodiment, the first LED light source 2 can use two LEDs with different color temperatures to realize the combination of various color temperatures, to perform color mixing with the second LED light source 3. They can be designed according to the needs of customers to realize the light adjustment and tone adjustment function requirements required by customers.

Embodiment 4

Figure 4:
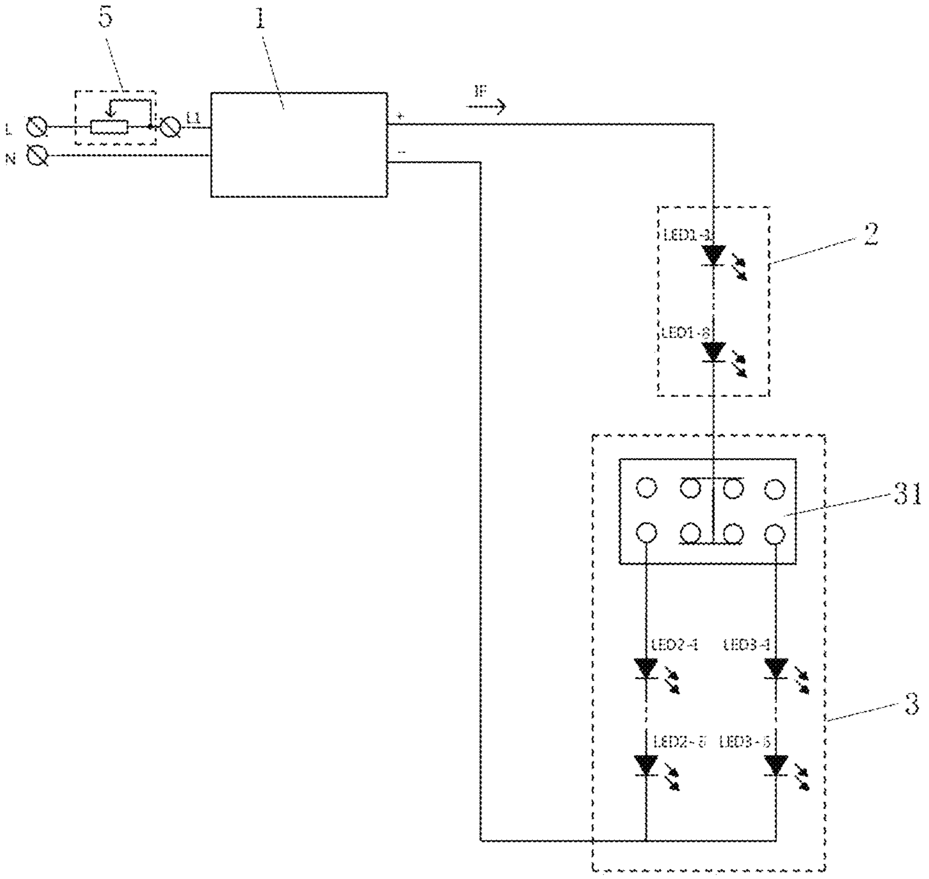
FIG. 4 is a light adjustment and tone adjustment circuit diagram of Embodiment 4 of the present invention.

Referring to FIG. 4, the difference between this Embodiment and Embodiment 2 is that the first LED light source 2 comprises eight LED1-1 to LED1-8 connected in series in sequence, and the color temperature of LED1-1 to LED1-8 is 3000K.

The second LED light source 3 comprises a second switch circuit 31, and the second switch circuit 31 is connected with five LED2-1 to LED2-5 connected in series in sequence, and five LED3-1 to LED3-5 connected in series in sequence, wherein the color temperature of LED2-1 to LED2-5 is 4000K, and the color temperature of LED3-1 to LED3-5 is 5000K.

By adopting the above technical solution, on the premise that both the first LED light source 2 and the second LED light source 3 are lit, when the second switch circuit 31 turns on the LED2-1 to LED2-5 alone, the LED2-1 to LED2-5 light up, and the color temperature of the whole lamp is 3000K+4000K mixed color display.

When the second switch circuit 31 turns on the LED3-1 to LED3-5 alone, the LED3-1 to LED3-5 light up, and the color temperature of the whole lamp is 3000K+5000K mixed color display.

When the second switch circuit 31 turns on LED2-1 to LED2-5 and LED3-1 to LED3-5 at the same time, LED2-1 to LED2-5 and LED3-1 to LED3-5 are connected in parallel and light up at the same time. At this time, the color temperature of the whole lamp is 3000K+4500K (4000K+5000K) mixed color display.

In this embodiment, the second LED light source 3 can use two LEDs with different color temperatures to realize the combination of various color temperatures, to perform color mixing with the first LED light source 2. They can be designed according to the needs of customers to realize the light adjustment and tone adjustment function requirements required by customers.

Embodiment 5

Figure 5:
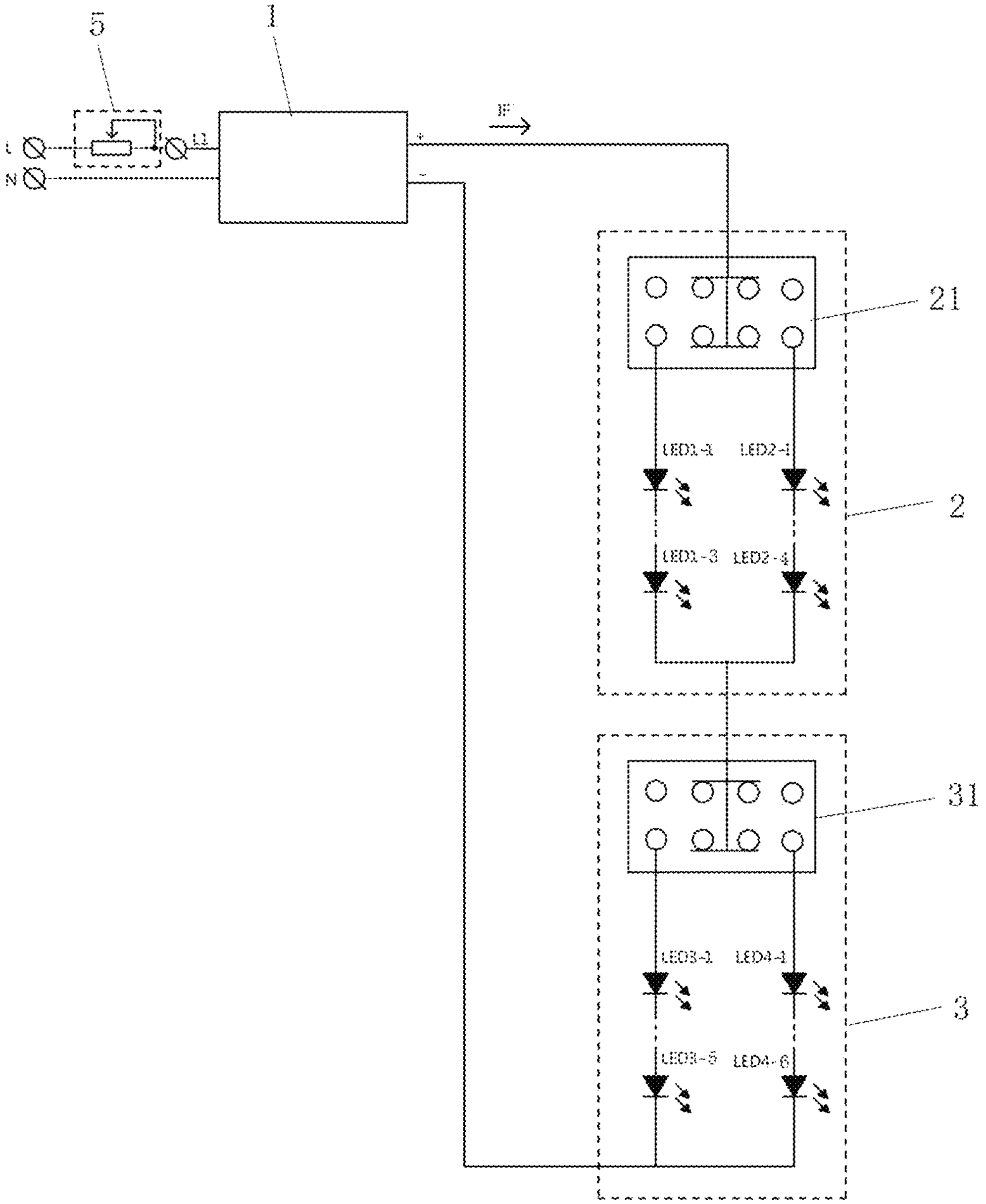
FIG. 5 is a light adjustment and tone adjustment circuit diagram of Embodiment 5 of the present invention.

Referring to FIG. 5, the difference between this Embodiment and Embodiment 2 is that the first LED light source 2 comprises a first switch circuit 21, and the first switch circuit 21 is connected with three LED1-1 to LED1-3 connected in series in sequence, and four LED2-1 to LED2-4 connected in series in sequence, wherein the color temperature of LED1-1 to LED1-3 is 3000K, and the color temperature of LED2-1 to LED2-4 is 4000K.

The second LED light source 3 comprises a second switch circuit 31. The second switch circuit 31 is connected with five LED3-1 to LED3-5 connected in series in sequence, and six LED4-1 to LED4-6 connected in series in sequence. The color temperature of LED3-1 to LED3-5 is 5000K, and the color temperature of LED4-1 to LED4-6 is 6000K.

By adopting the above technical solution, on the premise that both the first LED light source 2 and the second LED light source 3 are lit:

(1) When the first switch circuit 21 turns on LED1-1 to LED1-3 alone, LED1-1 to LED1-3 light up, and when the second switch circuit 31 turns on LED3-1 to LED3-5 alone, LED3-1 to LED3-5 light up, thus the color temperature of the whole lamp is 3000K+5000K mixed color display.

(2) When the first switch circuit 21 turns on LED1-1 to LED1-3 alone, LED1-1 to LED1-3 light up, and when the second switch circuit 31 turns on LED4-1 to LED4-6 alone, LED4-1 to LED4-6 light up, thus the color temperature of the whole lamp is 3000K+6000K mixed color display.

(3) When the first switch circuit 21 turns on LED2-1 to LED2-4 alone, LED2-1 to LED2-4 light up, and when the second switch circuit 31 turns on LED3-1 to LED3-5 alone, LED3-1 to LED3-5 light up, thus the color temperature of the whole lamp is 4000K+5000K mixed color display.

(4) When the first switch circuit 21 turns on LED2-1 to LED2-4 alone, LED2-1 to LED2-4 light up, and when the second switch circuit 31 turns on LED4-1 to LED4-6 alone, LED4-1 to LED4-6 light up, thus the color temperature of the whole lamp is 4000K+6000K mixed color display.

(5) When the first switch circuit 21 turns on LED1-1 to LED1-3 and LED2-1 to LED2-4 at the same time, LED1-1 to LED1-3 and LED2-1 to LED2-4 light up at the same time, and when the second switch circuit 31 turns on LED3-1 to LED3-5 alone, LED3-1 to LED3-5 light up, thus the color temperature of the whole lamp is 3500K (3000K+4000K)+5000K mixed color display.

(6) When the first switch circuit 21 turns on LED1-1 to LED1-3 and LED2-1 to LED2-4 at the same time, LED1-1 to LED1-3 and LED2-1 to LED2-4 light up at the same time, and when the second switch circuit 31 turns on LED4-1 to LED4-6 alone, LED4-1 to LED4-6 light up, thus the color temperature of the whole lamp is 3500K (3000K+4000K)+6000K mixed color display.

(7) When the first switch circuit 21 turns on LED1-1 to LED1-3 and LED2-1 to LED2-4 at the same time, LED1-1 to LED1-3 and LED2-1 to LED2-4 light up at the same time, and when the second switch circuit 31 turn on LED3-1 to LED3-5 and LED4-1 to LED4-6 at the same time, LED3-1 to LED3-5 and LED4-1 to LED4-6 light up at the same time, thus the color temperature of the whole lamp is 3500K (3000K+4000K)+5500K (5000K+6000K) mixed color display, and so on.

In this embodiment, both the first LED light source 2 and the second LED light source 3 can use two types of LEDs with different color temperatures to achieve a combination of various color temperatures and perform color mixing with each other to achieve more color temperature mixing options, which can be designed according to customer needs to achieve the light adjustment and tone adjustment function requirements required by customers.

Embodiment 6

Figure 6:
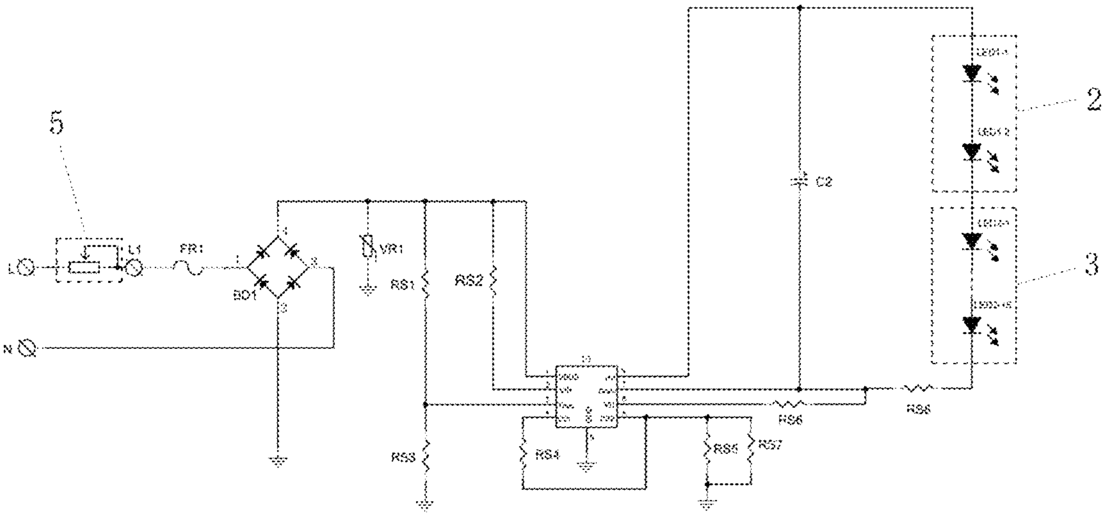
FIG. 6 is a light adjustment and tone adjustment circuit diagram of Embodiment 6 of the present invention.
Figure 7:
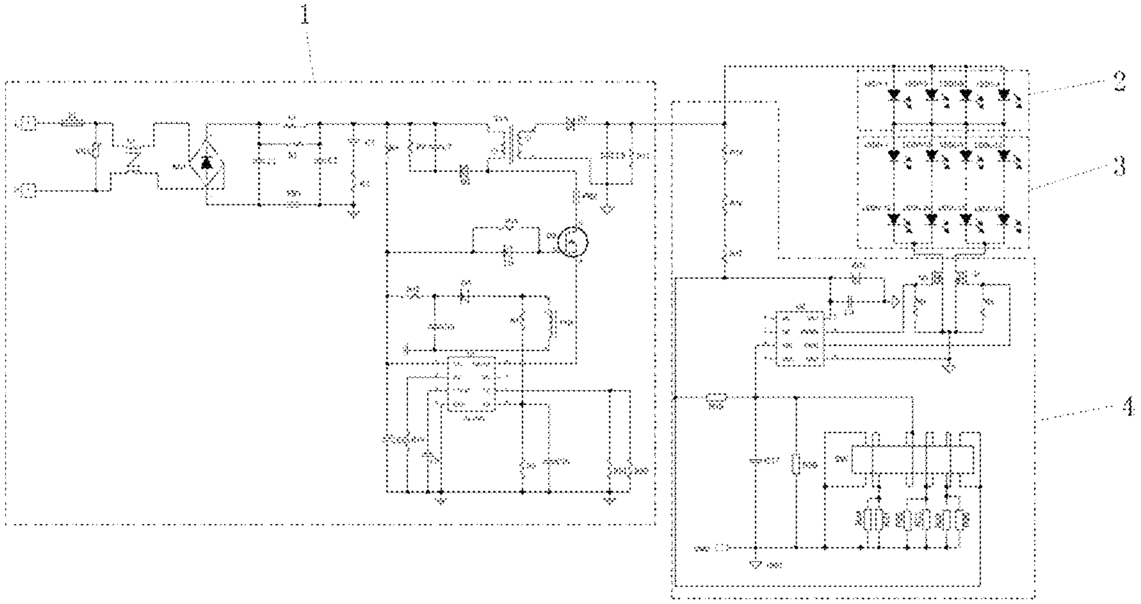
FIG. 7 is a light adjustment and tone adjustment circuit diagram of Embodiment 7 of the present invention.
Figure 8:
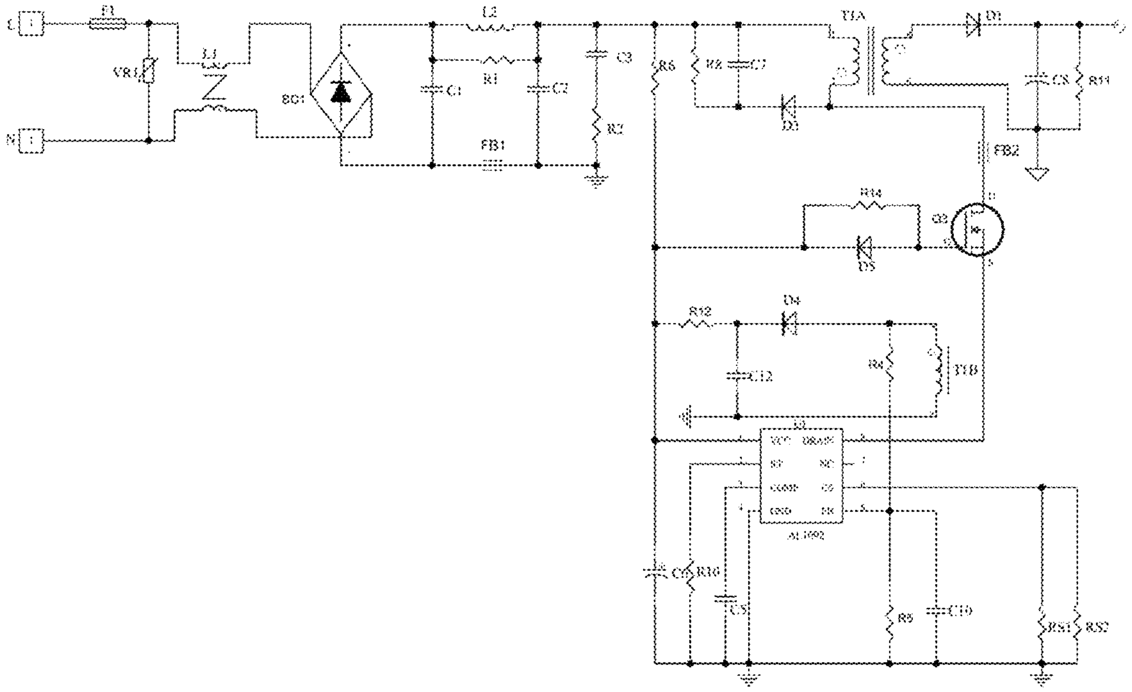
FIG. 8 is a circuit diagram of a power supply circuit of Embodiment 7 of the present invention.
Figure 9:
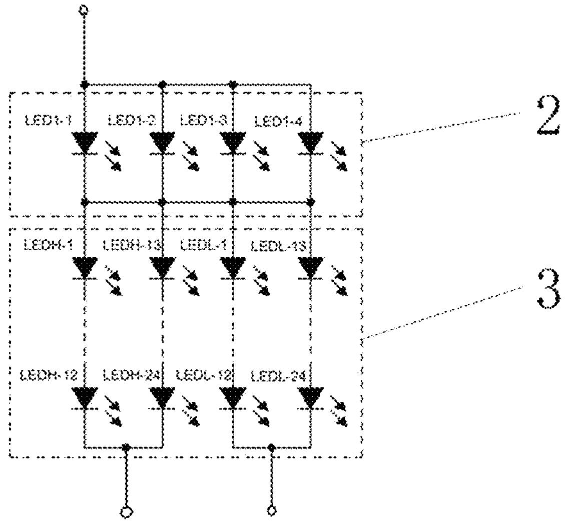
FIG. 9 is a circuit diagram of a first LED light source and a second LED light source of Embodiment 7 of the present invention.
Figure 10:
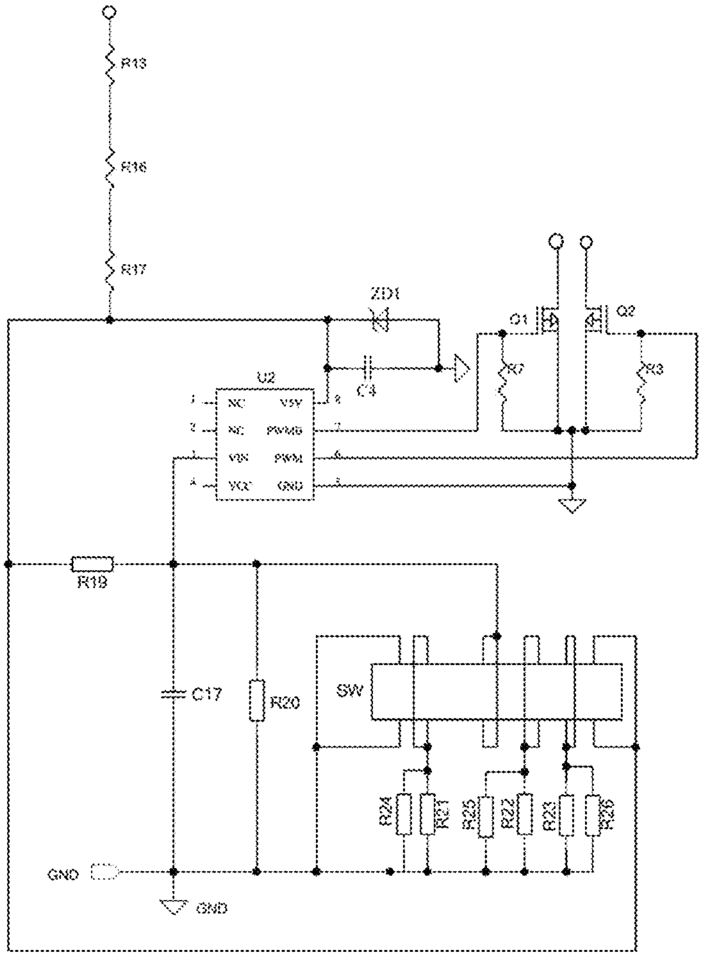
FIG. 10 is a circuit diagram of a light adjustment circuit of Embodiment 7 of the present invention.

Referring to FIG. 6, the difference between this Embodiment and Embodiment 2 is that the power supply circuit comprises a chip U1. Pin 1 of the chip U1 is respectively connected to one end of the resistor RS2, the resistor RS1, the variable resistor VR1 and the pin 4 of the rectifier bridge BD1. The other end of resistor RS2 is connected to pin 2 of chip U1. The other end of resistor RS1 is connected to pin 3 of chip U1 and one end of resistor RS3. The other end of resistor RS3 and variable resistor VR1 and pin 2 of the rectifier bridge BD1 is grounded. Pin 1 of the rectifier bridge BD1 is connected to the fuse FR1. The other end of the fuse FR1 is connected to the indicator light L1. The other end of the indicator light L1 is connected to the first light adjustment circuit 5. The first light adjustment circuit 5 is connected to the live wire L. Pin 3 of the rectifier bridge BD1 is connected with the neutral line N. Pin 4 of the chip U1 is connected with the resistor RS4. The other end of the resistor RS4 is connected with pin 5 of the chip U1. Pin 5 of the chip U1 is also connected with one end of the resistor RS5 and the resistor RS7. The other end of the resistor RS5 and the resistor RS7 are grounded. Pin 6 of the chip U1 is connected to one end of the resistor RS6. The other end of the resistor RS6 and pin 7 of the chip U1 are connected to the capacitor C2 and one end of the resistor RS8. The other end of the resistor RS8 is connected to the negative terminal of the second LED light source 3. Pin 8 of the chip U1 and the other end of the capacitor C2 are connected to the positive terminal of the first LED light source 2. The negative terminal of the first LED light source 2 is connected to the positive terminal of the second LED light source 3.

The first LED light source 2 comprises two LED1-1 to LED1-2 connected in series in sequence, the color temperature of LED1-1 to LED1-2 is 4000K, and the rated voltage of LED1 is 3V, that is, the rated tube voltage of the first LED light source 2 is 6V.

The second LED light source 3 comprises fifteen LED2-1 to LED2-15 connected in series in sequence, the color temperature of LED2-1 to LED2-15 is 5000K, and the rated voltage of LED2 is 9V, that is, the rated tube voltage of the second LED light source 3 is 135V.

Embodiment 7

Referring to FIGS. 7 to 10, the difference between this Embodiment and Embodiment 1 is that the power supply circuit 1 comprises a chip U1. Pin 1 of the chip U1 is respectively connected to one end of the capacitor C6, the resistor R12, the resistor R14, the diode D5 and the resistor R6. The other end of the resistor R12 is connected to the diode D4 and one end of the capacitor C12 respectively. The other end of the diode D4 is respectively connected to the resistor R4 and pin 4 of the inductor T1B. Pin 5 of the inductor T1B and the other end of the capacitor C12 are grounded. The other end of resistor R4 is connected to pin 5 of chip U1.

The other end of resistor R14 and diode D5 is connected to G terminal of transistor Q3. The S terminal of transistor Q3 is connected to pin 8 of chip U1. The D terminal of transistor Q3 is connected to one end of the ferrite bead FB2. The other end of ferrite bead FB2 is connected to diode D3 and pin 3 of inductor T1A. The other end of diode D3 is connected to one end of resistor R8 and capacitor C7. The other end of resistor R8 and capacitor C7 are respectively connected to pin 1 of inductor T1A, the other end of resistor R6, and one end of capacitor C3, inductor L2, resistor R1, and capacitor C2. The other end of capacitor C3 is connected to one end of resistor R2. The other end of the inductor L2 is respectively connected to the other end of the resistor R1, one end of the capacitor C1 and the rectifier bridge BD1. The other end of the rectifier bridge BD1 and the capacitor C1 is connected to one end of the ferrite bead FB1. The other end of the ferrite bead FB1, capacitor C2 and resistor R2 are grounded. The rectifier bridge BD1 is also connected to the inductor L1. One end of the inductor L1 is connected to one end of the variable resistor VR1 and the fuse F1. The other end of the fuse F1 is connected to the live wire L. One end of the inductor L1 is connected to the other end of the variable resistor VR1 and the neutral line N respectively. Pin 8 of the inductor T1A is connected to the diode D1. The other end of the diode D1 is respectively connected to the capacitor C8, the resistor R11 and the first LED power supply 2. Pin 6 of the inductor T1A, the other end of capacitor C8 and resistor R11 are grounded. Pin 2 of chip U1 is connected to resistor R10. Pin 3 of chip U1 is connected to capacitor C5. Capacitor C6, resistor R10, capacitor C5 and pin 4 of chip U1 are grounded. Pin 5 of chip U1 is also connected to resistor R5 and capacitor C10 respectively. Pin 6 of chip U1 is connected to resistor RS1 and resistor RS2 respectively. The other end of resistor RS1, resistor RS2, capacitor C10 and resistor R5 are grounded.

The light adjustment circuit comprises a chip U2. Pin 3 of the chip U2 are respectively connected with the resistor R19, the capacitor C17, the resistor R20 and the switch SW. The other end of the switch SW, the resistor R20 and the capacitor C17 are grounded. The other ends of the switch SW and the resistor R19 are respectively connected to the resistor R17, the diode ZD1, the capacitor C4 and pin 8 of the chip U2. The other end of the diode ZD1 and the capacitor C4 are grounded. The other end of the resistor R17 is connected to the resistor R16. The other end of the resistor R13 is connected to the resistor R13. The other end of the resistor R13 is connected to the positive terminal of the first light source LED2. Pin 7 of the chip U2 is connected to the transistor Q1 and the resistor R7. Pin 6 of the chip U2 is connected to the resistor R3 and the transistor Q2. The transistor Q1, the transistor Q2 and pin 5 of the chip U2 are grounded. The transistor Q1 and the transistor Q2 are also connected to the second LED light source 3.

The first LED light source 2 comprises four LED1-1 to LED1-4 connected in parallel with each other. The second LED light source 3 comprises one set of LEDH-1 to LEDH-12 connected in series in sequence, one set of LEDH-13 to LEDH-24 connected in series in sequence, one set of LEDH-13 to LEDH-24 connected in series in sequence, one set of LEDL-1 to LEDL-12 connected in series in sequence and one set of LEDL-13 to LEDL-24 connected in series in sequence, wherein LEDH-1 to LEDH-12, LEDH-13 to LEDH-24, LEDL-1 to LEDL-12, and LEDL-13 to LEDL-24 are connected in parallel with each other.

To sum up, in the present invention, at least two LED light sources with different tube pressures and color temperatures are connected in series to form a light source for a light fixture, and the output current of the power supply circuit can be changed by a light adjustment circuit to realize light adjustment and tone adjustment. It has the advantages of simple circuit design and low operating cost. The first LED light source and the second LED light source of the present invention respectively comprise several LED lamp beads connected in series or in parallel with each other, so that the design of the light source circuit can be diversified. A switch circuit can be added to the first LED light source and/or the second LED light source of the present invention. The switch circuit controls the conduction of LED lamp beads with different color temperatures inside the corresponding LED light source, so as to realize the expansion of various color temperature combinations, provide users with more selectivity, and thus make the user experience better. The light adjustment circuit of the present invention can be a 0-10V light adjustment circuit, a resistance light adjustment circuit or a thyristor light adjustment circuit, so that the light source circuit of the present invention can be applied to different light adjustment circuits. The power supply circuit of the present invention can be a switching power supply or a linear power supply, and the light source circuit of the present invention can be applied to different power supply circuits.

Although embodiments of the present invention have been shown and described, it will be understood by those skilled in the art that various changes, modifications, and substitutions can be made to these embodiments without departing from the principle and spirit of the invention and modifications, and that the scope of the present invention is defined by the appended claims and their equivalents.

The invention claimed is:

1. A control circuit for a light adjustment and a tone adjustment, comprising a power supply circuit and a light adjustment circuit connected to the power supply circuit, an output end of the power supply circuit is connected with a first LED light source and a second LED light source, the first LED light source is connected in series with the second LED light source, and a rated voltage and a color temperature of the first LED light source and those of the second LED light source are different;

wherein the first LED light source comprises a plurality of first LED lamp beads, and the plurality of the first LED lamp beads are connected in series;

wherein the second LED light source comprises a plurality of second LED lamp beads, and the plurality of the second LED lamp beads are connected in series;

wherein the rated voltage and the color temperature of each of the first LED lamp beads are same, the rated voltage and the color temperature of each of the second LED lamp beads are same, and the rated voltage of each of the first LED lamp beads is lower than the rated voltage of each of the second LED beads;

wherein the first LED light source and the second LED light source form an overall light source for a light fixture;

when the power supply circuit outputs a first output current, the overall light source has a first brightness and a first color temperature, and the first color temperature is a mixed color temperature of the first LED light source and the second LED light source; and when the power supply circuit outputs a second output current that is lower than the first output current, the overall light source has a second brightness and a second color temperature, the second brightness is darker than the first brightness, and the second color temperature is the color temperature of the second LED light source.

2. The control circuit for a light adjustment and a tone adjustment of claim 1, wherein the second LED light source comprises a second switch circuit and at least two sets of fourth LED lamp beads connected in series in sequence, the at least two sets of fourth LED lamp beads connected in series in sequence are respectively connected to the second switch circuit, and a color temperature of each set of the fourth LED lamp beads connected in series is different from each other.

3. The control circuit for a light adjustment and a tone adjustment of claim 2, wherein the color temperature of each set of the third LED lamp beads connected in series is also different from the color temperature of each set of the fourth LED lamp beads connected in series.

4. The control circuit for a light adjustment and a tone adjustment of claim 1, wherein the light adjustment circuit is a 0-10V light adjustment circuit or a first light adjustment circuit, and the first light adjustment circuit is a resistance light adjustment circuit or thyristor light adjustment circuit.

5. The control circuit for a light adjustment and a tone adjustment of claim 1, wherein the power supply circuit is a switching power supply or a linear power supply.

6. A method for realizing the control circuit for a light adjustment and a tone adjustment, wherein the method comprises:

connecting a first LED light source and a second LED light source with different rated voltage and color temperature in series to form an LED light source; wherein the first LED light source comprises a plurality of first LED lamp beads, and the plurality of the first LED lamp beads are connected in series; wherein the second LED light source comprises a plurality of second LED lamp beads, and the plurality of the second LED lamp beads are connected in series; and wherein the rated voltage and the color temperature of each of the first LED lamp beads are same, the rated voltage and the color temperature of each of the second LED lamp beads are same, and the rated voltage of each of the first LED lamp beads is lower than the rated voltage of each of the second LED beads; wherein the first LED light source and the second LED light source form an overall light source for a light fixture; when the power supply circuit outputs a first output current, the overall light source has a first brightness and a first color temperature, and the first color temperature is a mixed color temperature of the first LED light source and the second LED light source; and when the power supply circuit outputs a second output current that is lower than the first output current, the overall light source has a second brightness and a second color temperature, the second brightness is darker than the first brightness, and the second color temperature is the color temperature of the second LED light source supplying power to the LED light source by a power supply circuit; and adjusting an output current of the power supply circuit by the control circuit to realize the light adjustment and the tone adjustment, wherein the first LED light source comprises a first switch circuit and at least two sets of third LED lamp beads connected in series in sequence, the at least two sets of third LED lamp beads connected in series in sequence are respectively connected to the first switch circuit, and a color temperature of each set of the third LED lamp beads connected in series is different from each other.

* * * * *